US012174581B2

(12) United States Patent
Mushika et al.

(10) Patent No.: US 12,174,581 B2
(45) **Date of Patent: *Dec. 24, 2024**

(54) IMAGE-FORMING DEVICE HAVING GUIDE TO GUIDE DRAWER SUPPORTING DEVELOPING UNITS IN MAIN CASING

(71) Applicant: Brother Kogyo Kabushiki Kaisha, Nagoya (JP)

(72) Inventors: Motoaki Mushika, Hashima (JP); Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,234

(22) Filed: May 9, 2023

(65) Prior Publication Data

US 2023/0305485 A1 Sep. 28, 2023

Related U.S. Application Data

(63) Continuation of application No. 17/668,156, filed on Feb. 9, 2022, now Pat. No. 11,687,028, which is a (Continued)

(30) Foreign Application Priority Data

Jun. 30, 2008 (JP) ................................ 2008-170505

(51) Int. Cl.
*G03G 21/16* (2006.01)

(52) U.S. Cl.
CPC ..... *G03G 21/1676* (2013.01); *G03G 21/1604* (2013.01); *G03G 21/1619* (2013.01); (Continued)

(58) Field of Classification Search
CPC .......... G03G 21/1676; G03G 21/1604; G03G 21/1619; G03G 21/1623; G03G 2221/163; (Continued)

(56) References Cited

U.S. PATENT DOCUMENTS 4,952,989 A 8/1990 Kawano et al.
6,848,759 B2 2/2005 Doornbos et al.
(Continued)

FOREIGN PATENT DOCUMENTS

JP 2006-184552 A 7/2006
JP 2006-184553 A 7/2006
JP 2008-026361 A 2/2008

*Primary Examiner* — Sandra Brase
(74) *Attorney, Agent, or Firm* — Banner & Witcoff, Ltd.

(57) ABSTRACT

An image-forming device includes a main casing, a belt accommodated in the main casing, developing units arranged along the belt, a drawer configured to detachably support the developing units, the drawer configured to move to a position inside the main casing and to a position outside the main casing, and the drawer having a leading end and a trailing end in a pulling direction from the inside position to the outside position; and a guide configured to guide the drawer and to move between a first position and a second position when the drawer is at the inside position, the second position being farther from the belt than the first position from the belt. When the guide is at the second position, the guide is configured to be tilted downward relative to a horizontal direction such that the leading end is lower than the trailing end.

5 Claims, 7 Drawing Sheets

Related U.S. Application Data continuation of application No. 17/102,542, filed on Nov. 24, 2020, now Pat. No. 11,262,690, which is a continuation of application No. 16/704,065, filed on Dec. 5, 2019, now Pat. No. 10,852,690, which is a continuation of application No. 16/227,083, filed on Dec. 20, 2018, now Pat. No. 10,503,116, which is a continuation of application No. 15/814,794, filed on Nov. 16, 2017, now Pat. No. 10,175,638, which is a continuation of application No. 15/276,160, filed on Sep. 26, 2016, now Pat. No. 9,841,725, which is a continuation of application No. 14/954,572, filed on Nov. 30, 2015, now Pat. No. 9,471,033, which is a continuation of application No. 14/479,997, filed on Sep. 8, 2014, now Pat. No. 9,223,287, which is a continuation of application No. 14/045,930, filed on Oct. 4, 2013, now Pat. No. 8,831,478, which is a continuation of application No. 13/523,944, filed on Jun. 15, 2012, now Pat. No. 8,554,110, which is a continuation of application No. 12/476,760, filed on Jun. 2, 2009, now Pat. No. 8,204,405.

(52) U.S. Cl.
CPC ... *G03G 21/1623* (2013.01); *G03G 2221/163* (2013.01); *G03G 2221/1654* (2013.01); *G03G 2221/1684* (2013.01); *G03G 2221/1815* (2013.01)

(58) Field of Classification Search
CPC ... G03G 2221/1654; G03G 2221/1684; G03G 2221/1815
See application file for complete search history.

(56) References Cited

U.S. PATENT DOCUMENTS

| | | | | |
|---|---|---|---|---|
| 7,447,467 | B2 | 11/2008 | Kamimura et al. | |
| 7,463,847 | B2 | 12/2008 | Sato | |
| 8,204,405 | B2 | 6/2012 | Mushika et al. | |
| 8,554,110 | B2 | 10/2013 | Mushika et al. | |
| 8,831,478 | B2 | 9/2014 | Mushika et al. | |
| 9,223,287 | B2 | 12/2015 | Mushika et al. | |
| 9,471,033 | B2 | 10/2016 | Mushika et al. | |
| 9,841,725 | B2 | 12/2017 | Mushika et al. | |
| 10,175,638 | B2 | 1/2019 | Mushika et al. | |
| 10,503,116 | B2 | 12/2019 | Mushika et al. | |
| 10,852,690 | B2 | 12/2020 | Mushika et al. | |
| 11,262,690 | B2 | 3/2022 | Mushika et al. | |
| 11,687,028 | B2 * | 6/2023 | Mushika ............ | G03G 21/1676 399/119 |
| 2006/0067734 | A1 | 3/2006 | Igarashi et al. | |
| 2006/0140673 | A1 | 6/2006 | Kamimura et al. | |
| 2006/0140674 | A1 | 6/2006 | Sato | |
| 2006/0210306 | A1 | 9/2006 | Okamoto | |
| 2008/0159773 | A1 | 7/2008 | Murayama et al. | |

* cited by examiner

IMAGE-FORMING DEVICE HAVING GUIDE TO GUIDE DRAWER SUPPORTING DEVELOPING UNITS IN MAIN CASING

CROSS REFERENCE TO RELATED APPLICATION

This application is a continuation of U.S. application Ser. No. 17/668,156, filed Feb. 9, 2022, which is a continuation of U.S. application Ser. No. 17/102,542, filed Nov. 24, 2020, now U.S. Pat. No. 11,262,690, which is a continuation of U.S. application Ser. No. 16/704,065, filed Dec. 5, 2019, now U.S. Pat. No. 10,852,690, which is a continuation of U.S. application Ser. No. 16/227,083, filed Dec. 20, 2018, now U.S. Pat. No. 10,503,116, which is a continuation of U.S. application Ser. No. 15/814,794, filed Nov. 16, 2017, now U.S. Pat. No. 10,175,638, which is a continuation of U.S. application Ser. No. 15/276,160, filed Sep. 26, 2016, now U.S. Pat. No. 9,841,725, which is a continuation of U.S. application Ser. No. 14/954,572, filed Nov. 30, 2015, now U.S. Pat. No. 9,471,033, which is a continuation of U.S. application Ser. No. 14/479,997, filed Sep. 8, 2014, now U.S. Pat. No. 9,223,287, which is a continuation of U.S. application Ser. No. 14/045,930, filed Oct. 4, 2013, now U.S. Pat. No. 8,831,478, which is a continuation of U.S. application Ser. No. 13/523,944, filed Jun. 15, 2012, now U.S. Pat. No. 8,554,110, which is a continuation of U.S. application Ser. No. 12/476,760, filed Jun. 2, 2009, now U.S. Pat. No. 8,204,405, which claims priority from Japanese patent application No. 2008-170505 filed Jun. 30, 2008. The entire contents of the priority application are incorporated herein by reference.

TECHNICAL FIELD

The present invention relates to an image-forming device having a plurality of photosensitive drums, a plurality of developing units arranged beneath the photosensitive drums, and a developing unit support member integrally supporting the developing units.

BACKGROUND

A common image-forming device known in the art forms prescribed images on a recording sheet by irradiating light onto charged photosensitive drums to form electrostatic latent images thereon, supplying toner from developing units to develop the electrostatic latent images into toner images, and transferring the toner images onto the recording sheet.

One such image-forming device disclosed in Japanese Patent Application Publication No. 2006-184552 includes a plurality of photosensitive drums juxtaposed in the front-to-rear direction, a plurality of developing units arranged one beneath each of the photosensitive drums, a developing unit support member for integrally supporting the developing units, a retaining base for supporting the developing unit support member so that the support member can slide in the front-to-rear direction, and an elevating mechanism for raising and lowering the retaining base vertically. The elevating mechanism primarily includes a moving member that moves forward and rearward along with the opening and closing of a front cover on the body of the image-forming device, a linkage mechanism for converting front-to-rear movement of the moving member to vertical movement, and a support rod that is advanced and retracted vertically through the linkage mechanism. The support rod functions to support the retaining base. Hence, when the front cover is opened, the retaining base is lowered by the elevating mechanism, separating the developing units from the photosensitive drums. This allows the operator to pull the developing unit support member toward the operator in order to replace the developing units without the photosensitive drums interfering with the developing units.

SUMMARY

However, in the technology described above, a complex elevating mechanism must be provided in the image-forming device for lowering the retaining base, which mechanism increases the cost of the device.

In view of the foregoing, it is an object of the present invention to provide an image-forming device having a simple construction for separating the developing units from the photosensitive drums, thereby reducing the cost of the device.

To achieve the above and other objects, the present invention provides an image-forming device comprising: a main casing; a belt accommodated in the main casing; a plurality of developing units arranged along the belt; a drawer configured to detachably support the plurality of developing units, the drawer being configured to move to an inside position inside the main casing and to an outside position outside the main casing, a direction from the inside position to the outside position being a pulling direction, and the drawing having a leading end and a trailing end in the pulling direction; and a guide configured to guide the drawer and to move between a first position and a second position when the drawer is at the inside position, the second position being farther from the belt than the first position from the belt. When the guide is at the second position, the guide is configured to be tilted downward relative to a horizontal direction such that the leading end is lower than the trailing end.

DETAILED DESCRIPTION

Figure 1:
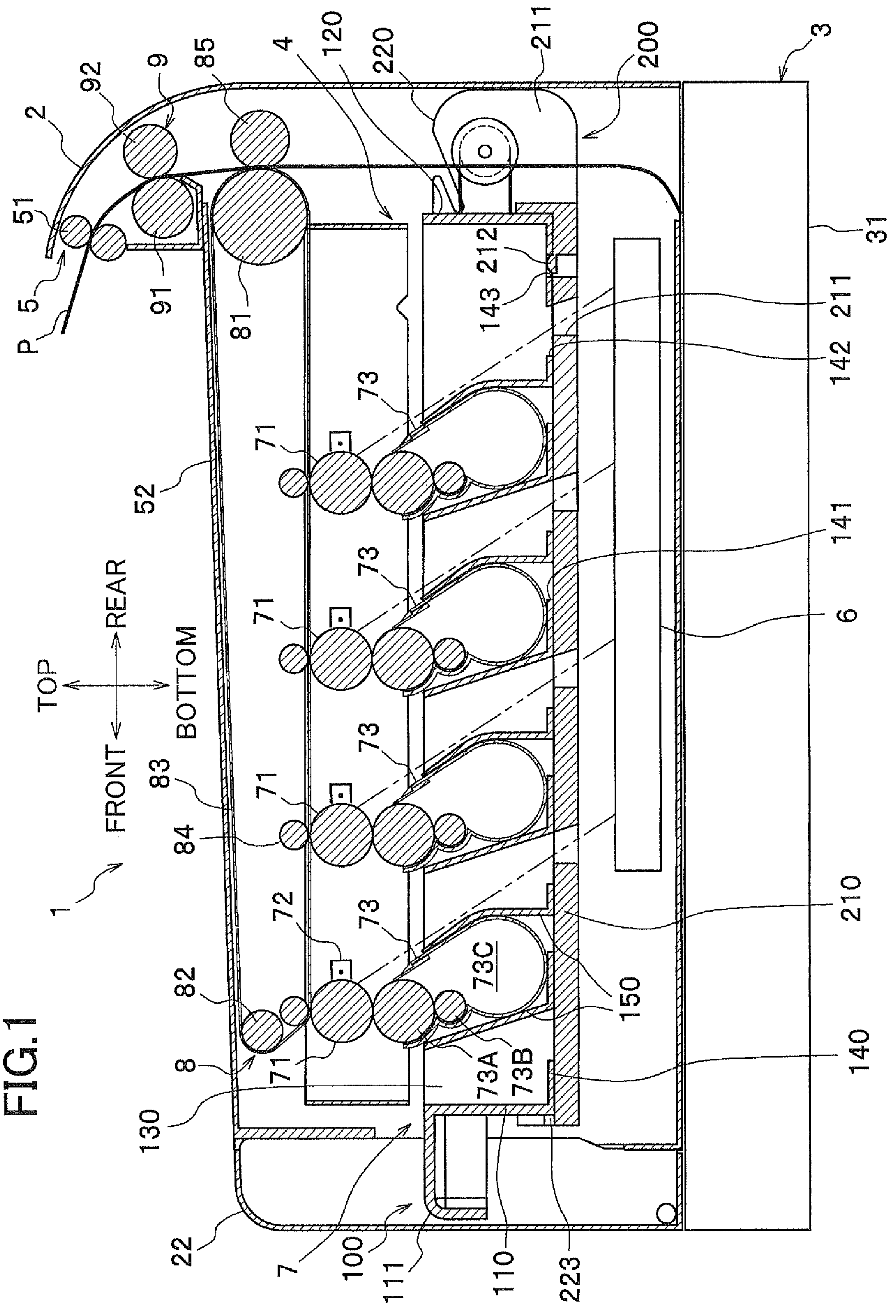
FIG. 1 is a cross-sectional view showing an overall structure of a color printer serving as an embodiment of the image-forming device according to the present invention.

Next, an image-forming device according to an embodiment of the present invention will be described while referring to the accompanying drawings. FIG. 1 is a cross-sectional view showing the overall structure of a color printer 1 serving as the embodiment of the image-forming device according to the present invention. After first describing the overall structure of the color printer 1, the features of the present invention will be described in detail.

<Overall Structure of the Color Printer>

As shown in FIG. 1, the color printer 1 includes a main casing 2, within which are disposed a feeding unit 3 for supplying sheets of a paper P to be printed, an image-forming unit 4 for forming images on the sheets of paper P supplied from the feeding unit 3, and a discharge unit 5 for discharging the paper P from the main casing 2 after images have been formed thereon.

Unless otherwise specified, the directions used in the following description will be based on the perspective of the user standing in front of and using the color printer 1. Hence, the top and bottom of the color printer 1 shown in FIG. 1 will be referred to as the "top" and "bottom" or the "upper part" and "lower part," the left side as the "front side" (near side), the right side as the "rear side" (far side), the far side in the drawing as the "left side," and the near side as the "right side."

<Feeding Unit>

The feeding unit 3 is disposed in the bottom section of the main casing 2 and includes a paper-feeding tray 31 detachably mounted in the main casing 2, and a paper-feeding mechanism (not shown). The paper-feeding mechanism in the feeding unit 3 separates and conveys sheets of the paper P from the paper-feeding tray 31 upward toward the image-forming unit 4.

<Image-Forming Unit>

The image-forming unit 4 includes a scanning unit 6, a process unit 7, a transfer unit 8, and a fixing unit 9.

[Scanning Unit]

The scanning unit 6 is disposed in the lower section of the main casing 2, and specifically between the paper-feeding tray 31 and the process unit 7. While not shown in the drawings, the scanning unit 6 includes a laser light-emitting unit, a polygon mirror, and a plurality of lenses and reflecting mirrors. The laser light-emitting unit of the scanning unit 6 emits a laser beam for each of the colors cyan, magenta, yellow, and black. The laser beams follow paths indicated by broken lines in FIG. 1 and are irradiated onto respective photosensitive drums 71 in the process unit 7.

[Process Unit]

The process unit 7 is disposed above the scanning unit 6, and specifically between the scanning unit 6 and the transfer unit 8. The process unit 7 includes a plurality of the photosensitive drums 71, a plurality of chargers 72 for charging each of the photosensitive drums 71, and a plurality of corresponding process cartridges 73 functioning as developing units.

Each process cartridge 73 is primarily configured of a developing roller 73A disposed in contact with the photosensitive drum 71 for supplying toner thereto, a supply roller 73B for supplying toner to the developing roller 73A, and a toner-accommodating section 73C accommodating toner. The process cartridges 73 are integrally supported in a drawer 100 that will be described later in greater detail.

With the process unit 7 having this configuration, the chargers 72 first charge the surfaces of the photosensitive drums 71, after which the scanning unit 6 emits laser beams onto the photosensitive drums 71 based on image data. At this time, areas of the charged surfaces exposed to the laser beams form electrostatic latent images. In the meantime, an agitator (not shown) disposed in the toner-accommodating section 73C of each process cartridge 73 supplies toner from the toner-accommodating section 73C to the developing roller 73A via the supply roller 73B. The developing roller 73A then supplies toner to the respective photosensitive drum 71, developing the electrostatic latent image on the photosensitive drum 71 into a toner image.

[Transfer Unit]

The transfer unit 8 primarily includes a drive roller 81, a follow roller 82, an intermediate transfer belt 83, a plurality of primary transfer rollers 84, and a secondary transfer roller 85.

The drive roller 81 and follow roller 82 are arranged parallel to each other and separated in the front-to-rear direction. The transfer belt 83 is an endless belt mounted over the drive roller 81 and follow roller 82 and stretched taut therebetween. The transfer belt 83 is driven to circulate together with the rotation of the follow roller 82 by the rotation of the drive roller 81.

The primary transfer rollers 84 are disposed inside the transfer belt 83 at positions confronting each of the photosensitive drums 71 so as to pinch the transfer belt 83 against the photosensitive drums 71. A high-voltage circuit board (not shown) applies a transfer bias to the primary transfer rollers 84, whereby the toner images carried on the photosensitive drums 71 are transferred onto the transfer belt 83.

The secondary transfer roller 85 is disposed at a position confronting the rear side of the drive roller 81 on the outside of the transfer belt 83. A high-voltage circuit board (not shown) applies a transfer bias to the secondary transfer roller 85, whereby toner images carried on the transfer belt 83 are transferred onto a sheet of paper P conveyed upward from the feeding unit 3.

[Fixing Unit]

The fixing unit 9 is disposed above the secondary transfer roller 85 and includes a heating roller 91 and a pressure roller 92. Toner images transferred onto a sheet of paper P are fixed to the sheet by heat in the fixing unit 9 as the sheet is pinched between and conveyed by the heating roller 91 and pressure roller 92.

<Discharge Unit>

The discharge unit 5 includes a plurality of conveying rollers 51. When a sheet of paper P is discharged from the fixing unit 9, the conveying rollers 51 convey the sheet onto a discharge tray 52 formed on top of the main casing 2.

<Structure in Vicinity of Drawer>

Figure 2:
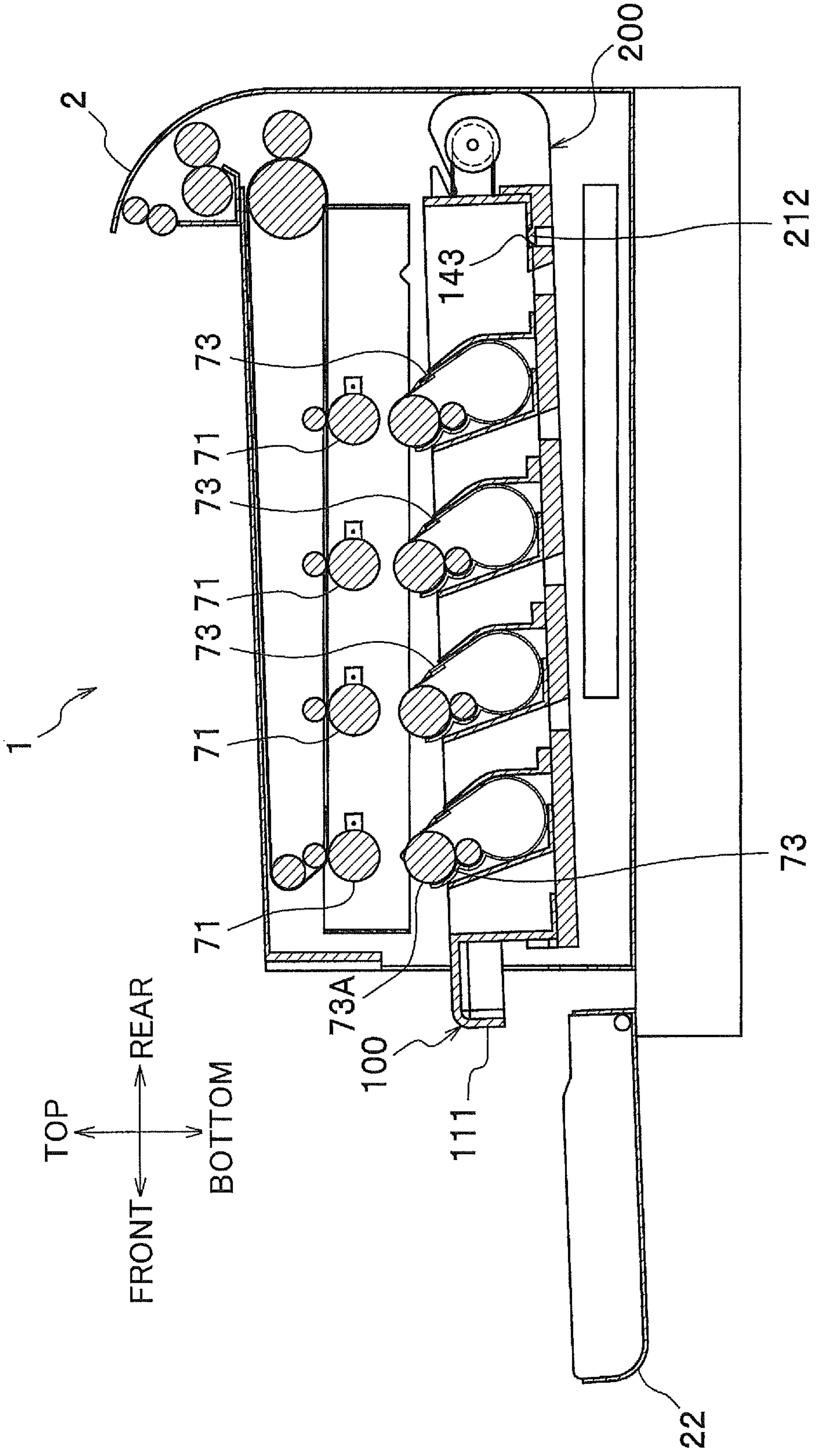
FIG. 2 is a cross-sectional view of the color printer according to the embodiment when a front cover has been opened and a drawer rail tilted at an angle.
Figure 3:
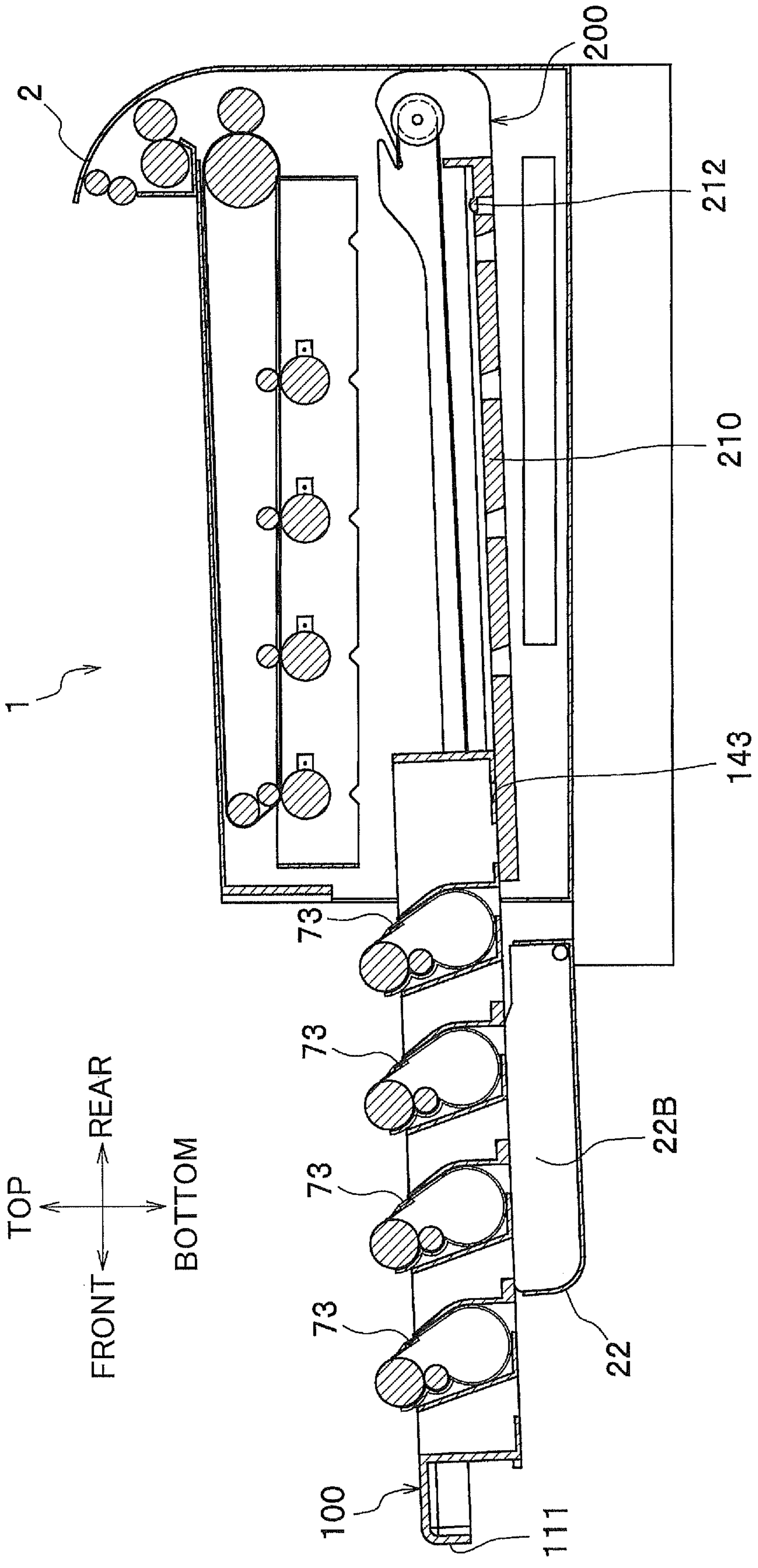
FIG. 3 is a cross-sectional view of the color printer according to the embodiment when the drawer has been pulled out from the main casing.
Figure 4:
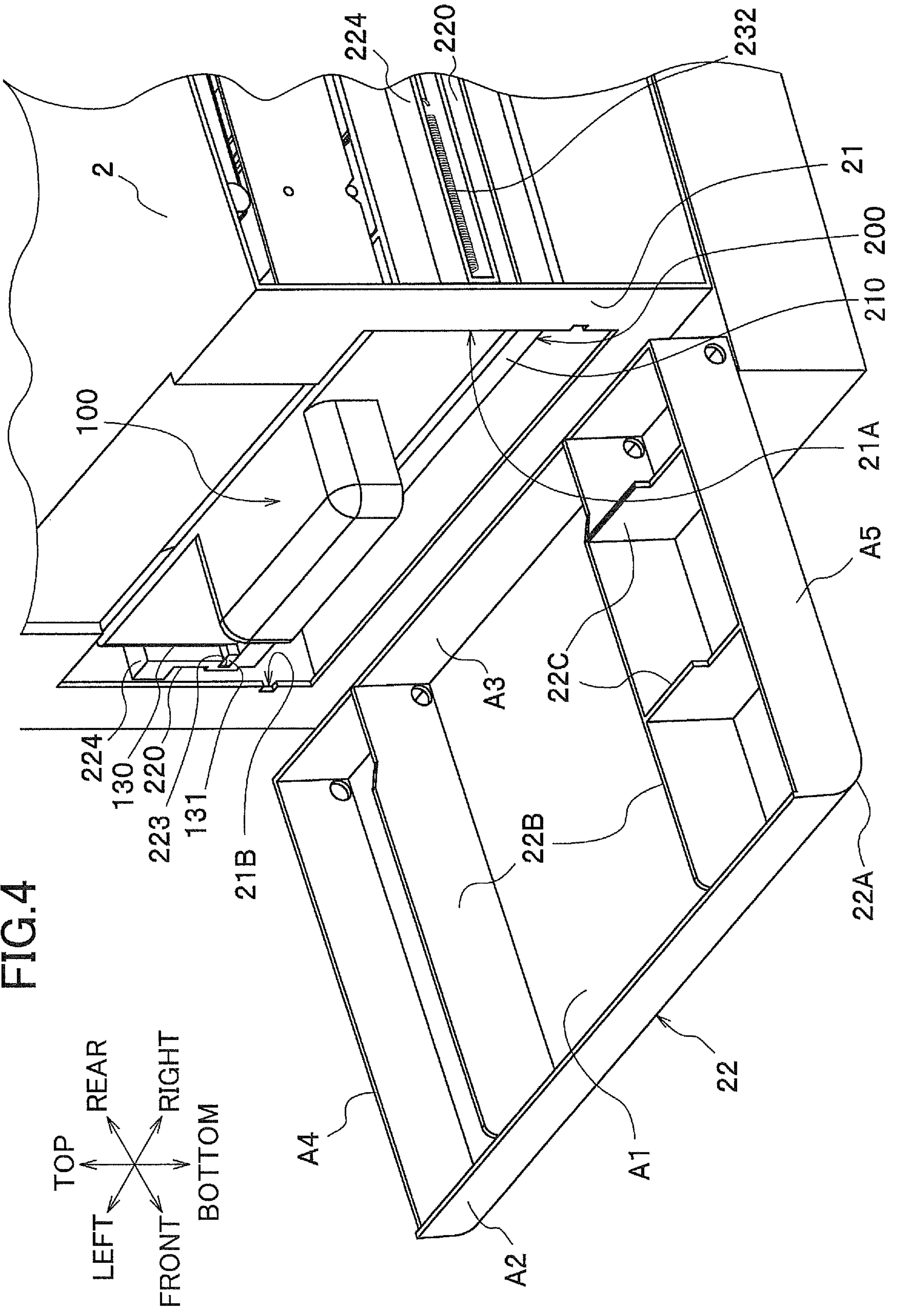
FIG. 4 is an enlarged perspective view showing a structure of the main casing at the front side thereof according to the embodiment.
Figure 5:
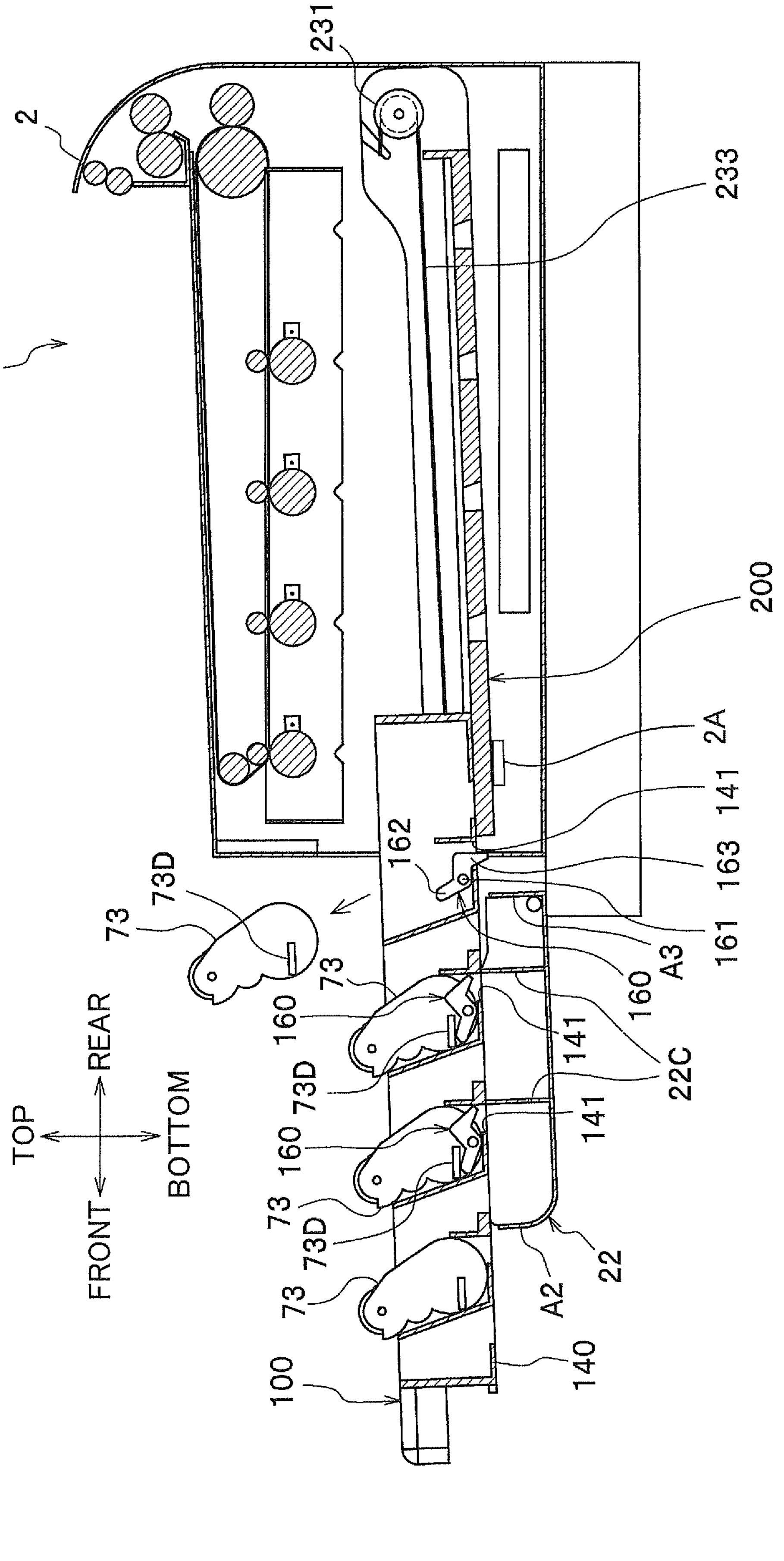
FIG. 5 is a cross-sectional view of the color printer showing a structure in a vicinity of locking members according to the embodiment.
Figure 6:
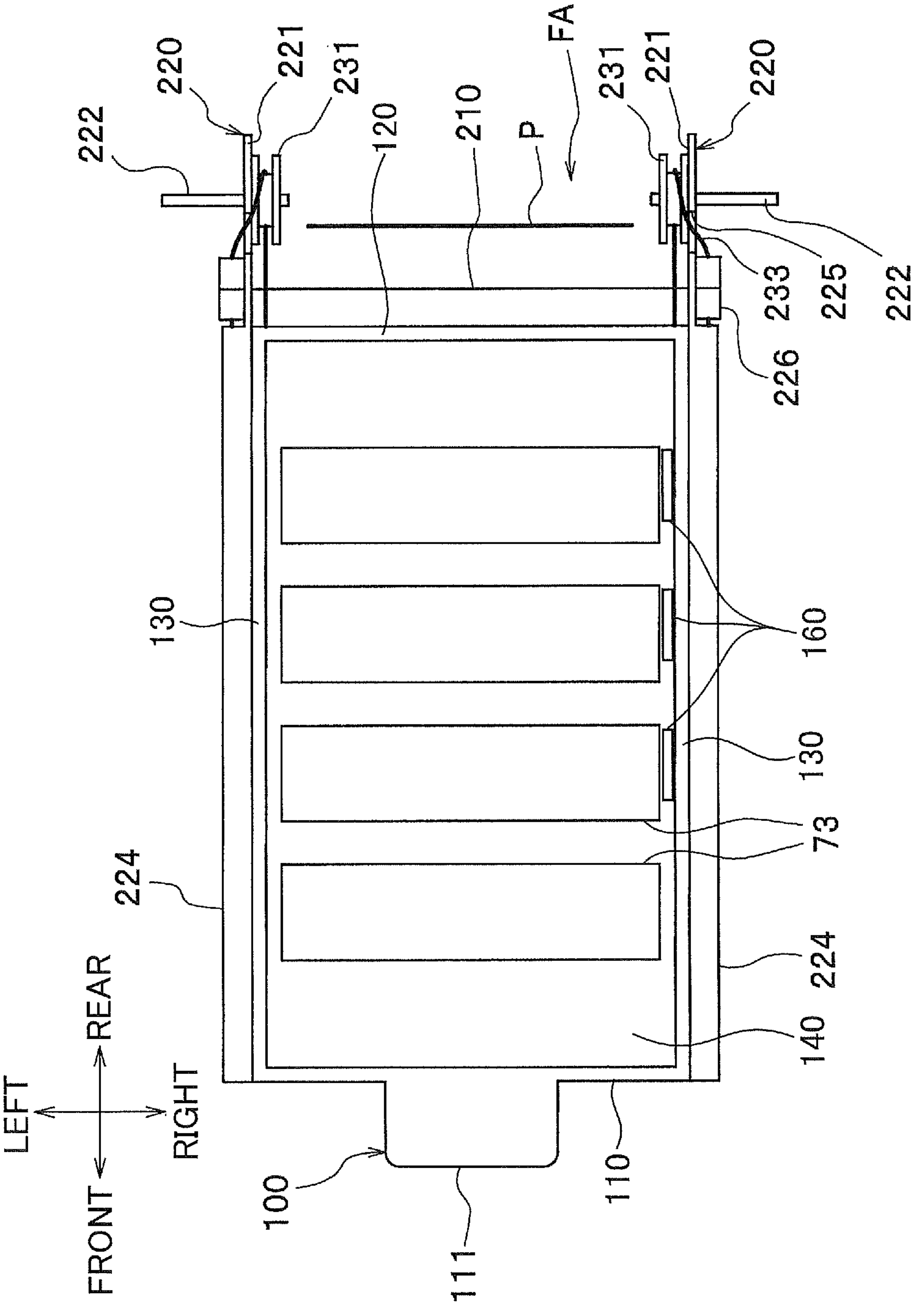
FIG. 6 is a simplified plan view of the drawer rail according to the embodiment.
Figure 7:
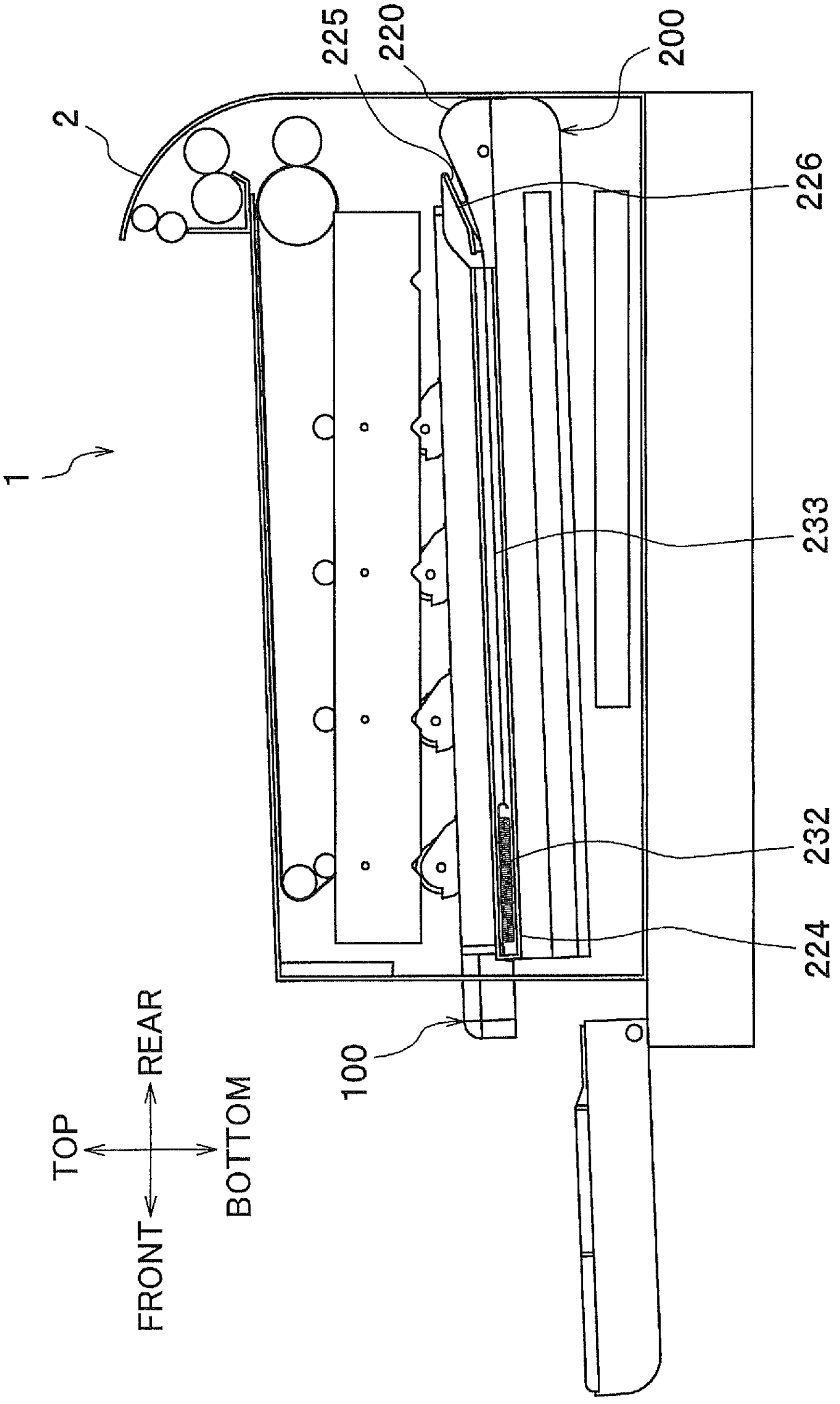
FIG. 7 is a cross-sectional view of the color printer showing a structure in a vicinity of a coil spring according to the embodiment.

Next, the structure in the vicinity of the drawer 100 will be described in detail. FIG. 2 is a cross-sectional view of the color printer 1 when a front cover has been opened and a drawer rail tilted at an angle. FIG. 3 is a cross-sectional view of the color printer 1 when the drawer has been pulled out from the main casing 2. FIG. 4 is an enlarged perspective view showing the structure of the main casing 2 at the front side thereof. FIG. 5 is a cross-sectional view of the color printer 1 showing the structure in the vicinity of locking members. FIG. 6 is a simplified plan view of the drawer rail. FIG. 7 is a cross-sectional view of the color printer 1 showing the structure in the vicinity of a coil spring.

As shown in FIG. 1, the drawer 100 is slidably supported on a drawer rail 200 that is pivotably supported in the main casing 2. With this structure, the drawer 100 can be pulled out from the main casing 2 along a downward slope, as illustrated in FIGS. 2 and 3. Next, the structure of the drawer 100, the drawer rail 200, and the front side of the main casing 2 will be described in detail.

[Drawer]

As shown in FIGS. 1 and 6, the drawer 100 is formed in a box-shape with an open top and primarily includes a front wall 110, a rear wall 120, a pair of side walls 130 disposed on left and right sides of the front wall 110 and rear wall 120 (only the left side is shown in FIG. 1), and a bottom wall 140. Further, pairs of supporting walls 150 are juxtaposed at prescribed intervals in the front-to-rear direction inside the drawer 100 for supporting the process cartridges 73. The pairs of supporting walls 150 grip the front and rear sides of the process cartridges 73 when the process cartridges 73 are detachably mounted therein.

A handle part 111 protrudes forward from the top edge on the front of the front wall 110. The handle part 111 provides a grip for the user to remove the drawer 100.

As shown in FIG. 4, a sliding piece 131 is provided on each of the side walls 130 (only one sliding piece 131 is shown in FIG. 4). The sliding pieces 131 extend along the side walls 130 in the front-to-rear direction and protrude outward from the bottom outer surfaces of the side walls 130. The sliding pieces 131 slidably engage in grooves 223 (only one groove 223 is shown in FIG. 4) formed in both the left and right inner sides of the drawer rail 200. Through this engagement, the drawer 100 and drawer rail 200 pivot integrally up and down, while the drawer 100 can move forward and rearward relative to the drawer rail 200.

As shown in FIGS. 5 and 6, three locking members 160 are provided on the right side wall 130 (the side wall 130 is not shown in FIG. 5). Specifically, the locking members 160 are arranged at positions corresponding to the three innermost process cartridges 73 with respect to the opening 21A formed in a front panel 21. Each locking member 160 has a shaft 161 rotatably provided in the side wall 130, an operating part 162 extending in one direction from the shaft 161, and an engaging part 163 extending from the shaft 161 in a different direction from the operating part 162. Through-holes 141 are formed in the bottom wall 140 of the drawer 100 for inserting the engaging parts 163.

In response to the mounting and removal of each process cartridge 73, the corresponding locking member 160 rotates between a protruding position in which the engaging part 163 protrudes downward through the bottom surface (outer surface) of the drawer 100, and a retracted position in which the engaging part 163 is withdrawn inside the drawer 100. More specifically, the locking members 160 are constantly urged toward the protruding position by springs (not shown) or their own weight and, when in the protruding position, engage with a part of the drawer rail 200 or a part of a front cover 22 described later on the path along which the drawer 100 is pulled out from the main casing 2. Further, when a process cartridge 73 is mounted in the drawer 100, a protrusion 73D formed on the right wall of the process cartridge 73 presses downward on the operating part 162 of the locking member 160, causing the locking member 160 to rotate into the retracted position in which the engaging part 163 is withdrawn inside the drawer 100.

As shown in FIG. 1, a plurality of exposure openings 142 is formed in the bottom wall 140 of the drawer 100 to allow passage of laser beams emitted from the scanning unit 6. In addition, an engaging hole 143 is formed in the bottom wall 140 of the drawer 100 for receiving an engaging piece 212 of the drawer rail 200 described later.

[Drawer Rail]

As shown in FIGS. 1 and 4, the drawer rail 200 includes a base part 210 supporting the bottom wall 140 of the drawer 100, and a pair of side walls 220 (only the left side wall 220 is shown in FIG. 1) protruding upward from the left and right edges of the base part 210 at positions outside the left and right sides of the drawer 100.

A plurality of exposure openings 211 is formed in the base part 210 to allow the passage of laser beams emitted from the scanning unit 6. The engaging piece 212 mentioned earlier is an elastically deformable member provided on the base part 210 and is shaped like a semicircular column with the rounded surface facing upward for engaging in the engaging hole 143 formed in the bottom wall 140 of the drawer 100. When the engaging piece 212 is engaged in the engaging hole 143, as shown in FIG. 2, this engagement prevents the drawer 100 from sliding outward by its own weight when the drawer rail 200 is pivoted at a slant. However, if the user grips the handle part 111 and pulls the drawer 100 with a prescribed amount of force, the pressure of the drawer 100 against the curved surface of the engaging piece 212 deflects the engaging piece 212 downward. Consequently, the engaging piece 212 exits the engaging hole 143, allowing the drawer 100 to be pulled outward.

As shown in FIG. 6, the rear ends of the side walls 220 form extended parts 221 that extend farther rearward (upstream relative to the pulling direction that the drawer 100 is pulled outward) than the rear edge of the base part 210. These left and right extended parts 221 form left and right boundaries of a conveying path FA through which a conveyed sheet of paper P is guided. That is, a space formed between the left and right extended parts 221 is the conveying path FA.

Rotational shafts 222 extend outward from the outer surfaces of the extended parts 221 and are pivotably supported in the main casing 2. Through this construction, the drawer rail 200 can pivot between a contact position (see FIG. 1) in which the process cartridges 73 (and specifically the developing rollers 73A) contact the photosensitive drums 71, and a separated position (see FIG. 2) in which the process cartridges 73 are separated from the photosensitive drums 71, enabling the drawer 100 to be pulled downward at a slant. As shown in FIG. 5, in the separated position, a front-end portion of the drawer rail 200 is supported by stoppers 2A provided on both side walls of the main casing 2.

The drawer rail 200 is maintained in the contact position through engagement with the main casing 2. The drawer rail 200 is disengaged from the main casing 2 by applying a prescribed force to the drawer rail 200. Any structure may be employed for engaging the drawer rail 200 to the main casing 2, such as a structure similar to the engaging piece 212 engaged in the engaging hole 143 described above. The drawer rail 200 may also be maintained in the contact position by engaging the drawer 100 with the main casing 2 rather than engaging the drawer rail 200 with the main casing 2. The drawer rail 200 is disengaged from the main casing 2 by applying a prescribed force to the drawer 100. In this case, pins may be provided on the side surfaces of the drawer 100 for engaging in holes formed in the main casing 2, and a lock release lever may be provided on the handle part 111 of the drawer 100 to retract the pins from the holes when operated by the user, for example.

Pulleys 231 positioned coaxially with the rotational shafts 222 are rotatably provided on the inner surfaces of the extended parts 221.

As shown in FIG. 4, the grooves 223 are formed in the lower inner surface of the side walls 220, and spring-accommodating parts 224 protrude outward from the upper parts of the side walls 220. As shown in FIG. 7, each spring-accommodating part 224 is configured of a front wall and top and bottom walls. Each spring-accommodating part 224 accommodates a coil spring 232, and part of an iron wire 233.

More specifically, one end of the coil spring 232 is fixed to the front wall of the respective spring-accommodating part 224, while the other end is fixed (connected) to the wire 233. The wire 233 is then led along a groove 225 formed in the upper rear of the respective side wall 220, and wound around the pulley 231 on the inner surface of the side wall 220 before being fixed (connected) to the drawer 100. With this construction, the coil springs 232 urge the drawer 100 toward inside the main casing 2 in an opposite direction with respect to the pulling direction.

In this embodiment, the urging force of the coil springs 232 is set sufficiently small so that the drawer 100 pulled out of the main casing 2 is not drawn back inside the main casing 2 when three or more process cartridges 73 are mounted in the drawer 100. In other words, when three or more process cartridges 73 are mounted in the drawer 100, since the total weight of the process cartridges 73 and the drawer 100 is sufficiently large, the frictional forces between the drawer 100, and the drawer rail 200 and front cover 22 counterbalance the urging force of the coil springs 232. When two or fewer process cartridges 73 are mounted in the drawer 100, since the total weight of the process cartridges 73 and the drawer 100 is sufficiently light, the urging force of the coil springs 232 overcomes the frictional forces between the drawer 100 and the like, drawing the drawer 100 into the main casing 2.

As shown in FIG. 7, a guide rib 226 is provided between the groove 225 and spring-accommodating part 224 on each side for maintaining the wires 233 in a direction aligned with the urging force of the coil springs 232. In this way, the urging force of the coil springs 232 can be properly transmitted to the drawer 100.

[Construction of Front Side of Main Casing]

As shown in FIG. 4, the front panel 21 is provided on the front side of the main casing 2. The opening 21A is formed in the front panel 21 for allowing the drawer 100 to be pulled out of the main casing 2. A pair of sliding grooves 21B is formed in the left and right edges of the front panel 21 bordering the opening 21A near the bottom thereof and open up until the opening 21A for slidably supporting the sliding pieces 131 provided on the drawer 100. Thus, when the drawer 100 is pulled out of the main casing 2, the drawer 100 is prevented from pivoting through the engagements of the sliding pieces 131 in the sliding grooves 21B.

The front cover 22 is provided on the front of the front panel 21, with the bottom edge rotatably supported on the main casing 2. By rotating the front cover 22 open and closed, the front cover 22 exposes and covers the opening 21A formed in the front panel 21. The front cover 22 is primarily configured of a main cover body 22A having a box-shape that is open on the inside (or the top when the front cover 22 is open), a pair of left and right rail ribs 22B provided in the main cover body 22A, and a pair of front and rear engaging ribs 22C disposed in the right side of the main cover body 22A.

The main cover body 22A is configured of a substantially rectangular bottom wall A1; and an upper wall A2, a lower wall A3, a left wall A4, and a right wall A5 erected from the edges of the bottom wall A1. The main cover body 22A is formed with sufficient depth for accommodating the handle part 111 of the drawer 100 when the front cover 22 is closed (see FIG. 1).

The rail ribs 22B are disposed at positions inward from the left and right edges of the drawer 100 and are symmetrical in the left-to-right direction. When the front cover 22 is in an open state, as shown in FIG. 3, the top edges of the rail ribs 22B are aligned with the sloped top surface of the base part 210. Accordingly, the drawer 100 is pulled out of the main casing 2 along the drawer rail 200 and supported on the rail ribs 22B of the front cover 22.

As shown in FIG. 4, the engaging ribs 22C link the right rail rib 22B with the right wall A5 of the main cover body 22A. The pair of engaging ribs 22C, and the upper wall A2 and lower wall A3 of the main cover body 22A are arranged at prescribed intervals in the front-to-rear direction. As shown in FIG. 5, the engaging ribs 22C, and the lower wall A3 of the main cover body 22A can engage with one of the three locking members 160 provided on the drawer 100, depending on how far the drawer 100 is pulled out of the main casing 2.

It is also possible to provide an additional locking member 160 for the forwardmost process cartridge 73. However, when the drawer 100 is pulled out of the main casing 2 until the forwardmost process cartridge 73 is withdrawn farther forward than the upper wall A2 of the front cover 22 in this embodiment, the locking member 160 for this process cartridge 73 would engage with the upper wall A2 of the front cover 22, potentially scratching the outer surface of the upper wall A2. Therefore, it is preferable not to provide an additional locking member 160 for the forwardmost process cartridge 73.

<Method of Replacing Developing Units>

Next, a method of replacing the process cartridges 73 will be described. As shown in FIG. 2, after opening the front cover 22, the user grips the handle part 111 of the drawer 100, applies the prescribed force to the drawer rail 200 to disengage the drawer rail 200 from the main casing 2, and pivots the drawer 100 and drawer rail 200 downward so that the process cartridges 73 separate from the photosensitive drums 71. Subsequently, as shown in FIG. 3, the user pulls the drawer 100 from the main casing 2 at a downward slant while maintaining a grip on the handle part 111 until the process cartridges 73 of the drawer 100 are exposed.

Next, the user replaces the desired process cartridge 73. For example, if the innermost process cartridge 73 needs to be replaced, the user removes the innermost process cartridge 73 from the drawer 100, as shown in FIG. 5. At this time, the locking member 160 released by the process cartridge 73 just removed rotates into the protruding position in which the engaging part 163 protrudes downward from the bottom surface of the drawer 100 and confronts the front edge of the drawer rail 200 in the direction that the drawer 100 is urged back into the main casing 2. In this case, since only one process cartridge 73 has been removed from the drawer 100, the total weight of the drawer 100 and the process cartridges 73 remaining in the drawer 100 maintain the drawer 100 in its current position shown in FIG. 5.

If the user next removes the second process cartridge 73 positioned second from the innermost position, for example, the middle locking member 160 released at this time also rotates into the protruding position with the engaging part 163 protruding downward from the bottom surface of the drawer 100 and engaging with one of the engaging ribs 22C of the front cover 22 to prevent the drawer 100 from being drawn back into the main casing 2. Since the main casing 2 is now lighter after two process cartridges 73 have been removed, the urging force of the coil springs 232 has sufficient force to draw the drawer 100 back into the main casing 2, but the engagements between the locking members 160 and the engaging rib 22C and front edge of the drawer rail 200 maintains the drawer 100 in its current position. Accordingly, the user can replace two or more process cartridges 73 at the same time without maintaining a grip on the drawer 100, thereby simplifying the replacement process.

After replacing the process cartridges 73, the user grips the handle part 111 and pushes the drawer 100 back into the main casing 2 along an upward slope. In the same motion, the drawer 100 and drawer rail 200 can be pivoted upward to complete mounting of the drawer 100 in the main casing 2.

With the construction described above, the drawer 100 according to this embodiment can obtain the following effects. Since the process cartridges 73 can be separated from the photosensitive drums 71 through a simple construction for pivotably supporting the drawer rail 200 in the main casing 2, it is not necessary to provide a complex elevating mechanism as described in the prior art, thereby reducing the cost of the color printer 1.

Further, since the color printer 1 is configured so that the drawer 100 is pulled out of the main casing 2 along a downward slope, the weight of the drawer 100 itself can be used when pulling the drawer 100 from the main casing 2 so that the user need not apply much force. Further, by providing the coil springs 232 to urge the drawer 100 back into the main casing 2, the user need not apply much force when pushing the drawer 100 along the upward slope to return the drawer 100 into the main casing 2.

Further, since the top surface of the drawer 100 drops continuously downward as the drawer 100 is pulled toward the user, the user can more easily see the process cartridges 73 for replacing the same than when the top surface of the drawer 100 remains level.

By employing the pulleys 231 and wires 233 to dispose the coil springs 232 outside the left and right edges of the drawer 100, the dimension of the color printer 1 corresponding to the direction that the drawer 100 is pulled from the main casing 2 can be made more compact than when the coil springs 232 are disposed on the rear side of the drawer 100.

By providing the pulleys 231, coil springs 232, and wires 233 on the drawer rail 200, the distance between each coil spring 232 and corresponding pulley 231 and the distance between each pulley 231 and the drawer 100 remains constant when the drawer rail 200 is pivoted, thereby reducing the load on the pulleys 231.

Further, providing the rotational shafts 222 of the drawer rail 200 and the pulleys 231 coaxially makes effective use of space.

By providing the pair of extended parts 221 to form left and right boundaries of the conveying path FA, the sheets of paper P can be conveyed farther forward than the rear edge of the drawer rail 200 (distal ends of the extended parts 221), enabling the device to be made more compact in the dimension corresponding to the direction that the drawer 100 is pulled out of the main casing 2. If the rear edge of the drawer rail were rotatably supported by a single shaft extending from left to right, the sheets of paper would have to be conveyed farther rearward than the rear edge of the drawer rail, contributing to an increase in the size of the device.

By providing the locking members 160 that protrude downward from the bottom surface of the drawer 100 and engage with the drawer rail 200 or front cover 22 when a process cartridge 73 is removed from the drawer 100, it is possible to prevent the coil springs 232 from abruptly pulling the drawer 100 back into the main casing 2 while the user is replacing the process cartridges 73.

By providing the sliding pieces 131 and the grooves 223 to regulate vertical movement of the drawer 100 relative to the drawer rail 200, the user can simultaneously pivot the drawer rail 200 and pull the drawer 100 out of the main casing 2 in a continuous motion while maintaining a grip on the handle part 111 of the drawer 100.

While the invention has been described in detail with reference to specific embodiments thereof, it would be apparent to those skilled in the art that many modifications and variations may be made therein without departing from the spirit of the invention, the scope of which is defined by the attached claims.

For example, while a process cartridge 73 having a toner-accommodating section 73C is employed as the developing unit in the embodiment described above, developing units without a toner-accommodating section may be employed instead.

While coil springs 232 are employed as urging members in the embodiment described above, a torsion spring or other urging member may be employed instead. Further, while the wires 233 are employed as cord members in the above embodiment, cords formed of cloth, hemp, artificial fibers, leather, or the like may be employed instead.

Further, while the pulleys 231 are employed as shaft members in the embodiment described above, shafts that do not rotate may be employed instead. However, use of the rotatable pulleys 231 can reduce friction caused by sliding between the cord member and shaft member.

In the embodiment described above, the locking member 160 is accommodated inside the drawer 100 in the retracted position, but this embodiment is not limited to this configuration. For example, a part of the locking member 160 may be positioned outside the drawer 100 in the retracted position, provided that the locking member 160 is positioned closer to the drawer 100 than the protruding position. In this case, the locking members in the retracted position and the drawer rail or front cover must be configured to not interfere with each other when the drawer is pulled out or pushed in.

In the embodiment described above, the locking member 160 is rotatably supported at a point in substantially the center thereof, and contact with the process cartridge 73 on one end of the locking member 160 causes the other end to advance and retract relative to the bottom surface of the drawer 100, but the embodiment is not limited to this construction. For example, the locking member may be rotatably supported at one end, whereby contact by the process cartridge 73 in the center region causes the other end to advance and retract relative to the bottom surface of the drawer.

In the embodiment described above, the urging force of the coil springs 232 is set to a level incapable of pulling the drawer 100 back into the main casing 2 when three or more process cartridges 73 are mounted in the drawer 100, but the urging force of the coil springs 232 may be set weaker or stronger than that in the above embodiment.

Here, the locking members 160 need not be provided if the urging force of the coil springs 232 is set to such a weak level that the coil springs 232 cannot draw the drawer 100 back into the main casing 2 even after all process cartridges 73 have been removed. However, since the urging force of the coil springs 232 can be set to a strong level when providing the locking members 160 described in the above embodiment, the coil springs 232 can effectively aid the user in the operation for returning the drawer 100 to the main casing 2.

In the embodiment described above, the sliding pieces 131 are provided on the drawer 100, and the grooves 223 are formed in the drawer rail 200 for restricting vertical movement of the sliding pieces 131 (the drawer 100). However, it is also possible to form sliding grooves in the drawer and to provide sliding pieces on the drawer rail for restricting vertical movement of the drawer.

While the recording sheet described in the embodiment is paper, such as cut sheets of a light or heavy weight or postcards, sheets of transparencies or other recording sheets may also be employed. Further, while the present invention is applied to the color printer 1 in the preferred embodiment, the present invention may be applied to another image-forming device, such as a photocopier or a multifunction peripheral.

In the embodiment described above, the developing rollers 73A contact the photosensitive drums 71 when the drawer rail 200 is maintained in the contact position. However, if the process cartridges 73 can supply toner to the photosensitive drums 71, the developing rollers 73A may not contact the photosensitive drums 71 when the drawer rail 200 is maintained in the contact position.

What is claimed is:

1. An image forming device comprising:
a main casing having an opening;
a drawer movable between an inside position and an outside position through the opening, the drawer being positioned inside the main casing in a case where the drawer is at the inside position;
a cartridge comprising a developing roller, the cartridge being detachably attached to the drawer;
an urging unit configured to urge the drawer toward the inside position; and
a front cover movable between an open position at which the front cover opens the opening and a closed position at which the front cover closes the opening, the front cover being configured to contact a bottom of the drawer when the front cover is in the open position and the drawer is in the outside position.

2. The image forming device according to claim 1, wherein the urging unit comprises a coil spring configured to pull the drawer toward the inside position.

3. The image forming device according to claim 2, wherein the urging unit further comprises:
a wire connecting the coil spring to the drawer to transmit a pulling force of the coil spring to the drawer, the coil spring pulling the wire, at a position where the coil spring is connected to the wire, in a direction defined from the inside position of the drawer to the outside position of the drawer; and
a pulley configured to guide the wire, while changing a direction in which the wire extends, thereby causing the wire to pull the drawer, at a position where the wire is connected to the drawer, in a direction defined from the outside position of the drawer to the inside position of the drawer.

4. The image forming device according to claim 1, wherein the front cover includes:
a main cover body; and
a rail rib provided in the main cover body and configured to contact the drawer in the outside position.

5. The image forming device according to claim 4,
wherein the main casing includes a base part configured to support the bottom of the drawer in the inside position, and
wherein, when the front cover is in the open position, a top edge of the rail rib is aligned with a top surface of the base part to allow the drawer to be pulled out of the main casing along the top surface of the base part and the top edge of the rail rib.

* * * * *